United States Patent [19]

Kishi et al.

[11] Patent Number: 4,803,633
[45] Date of Patent: Feb. 7, 1989

[54] MACHINE TOOL FOR TRACER CONTROLLED MACHINERY AND NUMERICAL CONTROLLED MACHINERY

[75] Inventors: Hajimu Kishi; Mitsuo Matsui; Hitoshi Aramaki, all of Tokyo, Japan

[73] Assignee: Fanuc Ltd., Yamanashi, Japan

[21] Appl. No.: 129,374

[22] Filed: Nov. 23, 1987

Related U.S. Application Data

[63] Continuation of Ser. No. 793,070, filed as PCT JP85/00073 on Feb. 20, 1985, published as WO85/03667 on Aug. 29, 1985, abandoned.

[30] Foreign Application Priority Data

Feb. 20, 1984 [JP] Japan .................................. 59-28803

[51] Int. Cl.$^4$ ...................... B28Q 15/00; B28Q 35/12
[52] U.S. Cl. ............................ 364/474.03; 364/474.11
[58] Field of Search ................ 364/474, 475, 167-171, 364/133-139; 340/825.22, 825.23

Primary Examiner—Allen MacDonald
Attorney, Agent, or Firm—Armstrong, Nikaido, Marmelstein & Kubovcik

[57] ABSTRACT

There are provided a tracing control apparatus (1), a numerical control apparatus (2), and switching circuits (3X, 3Y, 3Z) for switching and transmitting selectively control instructions from the tracing control apparatus (1) and the numerical control apparatus (2), to a three-axis driving means for the tracer controlled machining (4) and a three-axis driving means for the numerically controlled machining (5) in accordance with selection signals. A numerically controlled machining and tracer controlled machining selection signal ($S_C$) is used as one of the selection signals besides a tracer controlled machining selection signal ($S_A$) and a numerically controlled machining selection signal ($S_B$). When the numerically controlled machining and tracer controlled machining selection signal ($S_C$) is selected, the three-axis driving means for the tracer controlled machining (4) is controlled by the tracing control apparatus (1), and the three-axis driving means for the numerically controlled machining (5) is controlled by the numerical control apparatus (2), independently. As a result, it is possible to perform the preparation for the tracer controlled machining or the conversion of the tracer controlled machining data into digital information, simultaneously, with the numerically controlled machining.

6 Claims, 7 Drawing Sheets

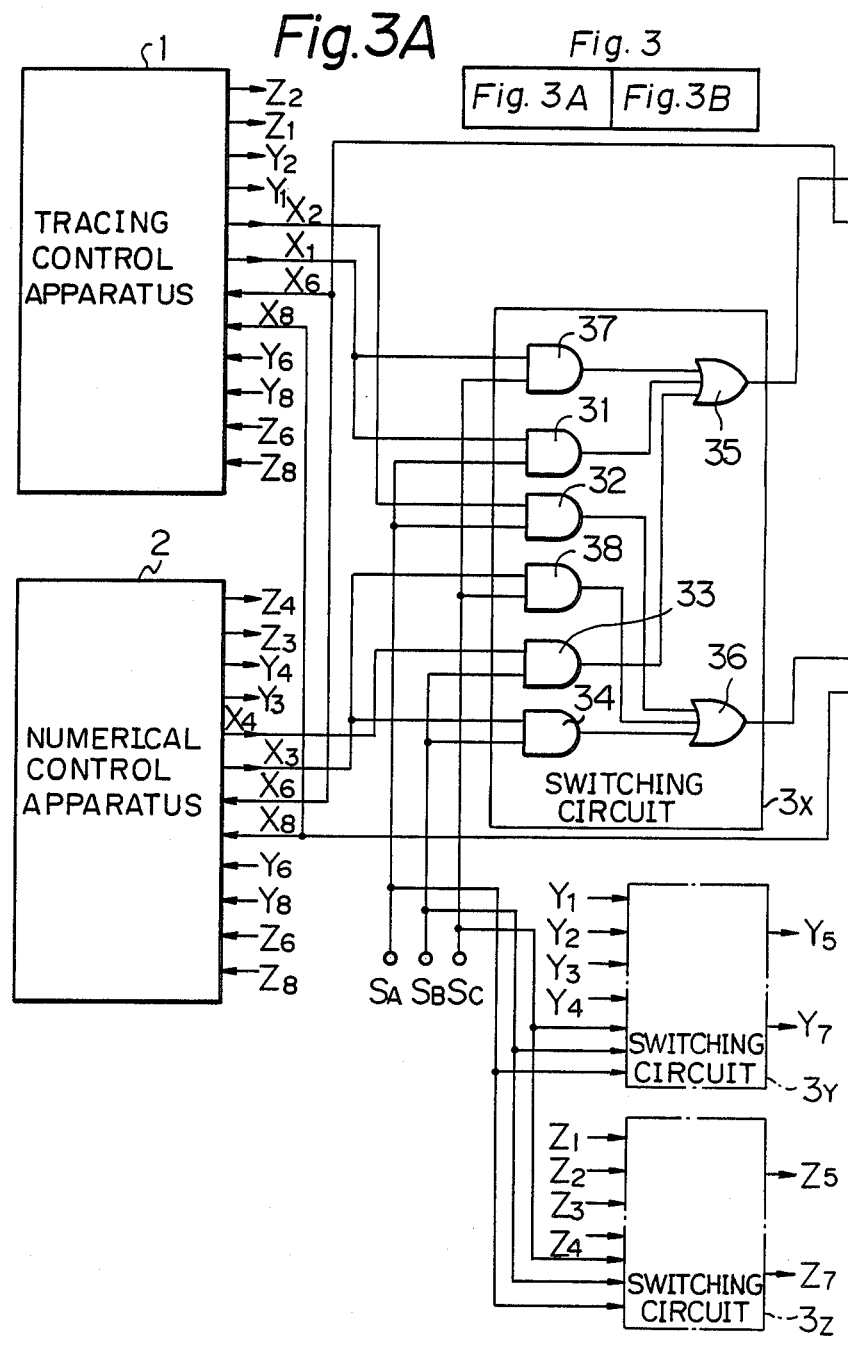

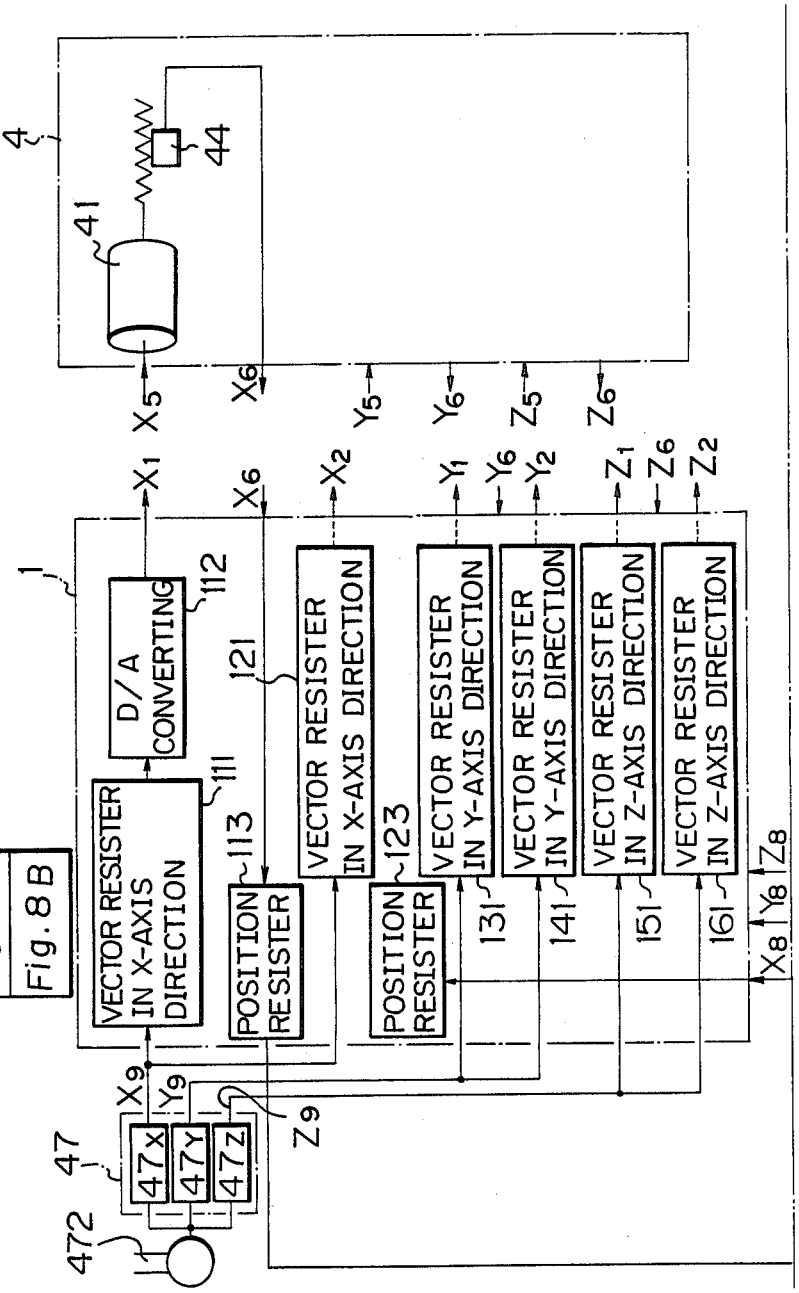

MACHINE TOOL FOR TRACER CONTROLLED MACHINERY AND NUMERICAL CONTROLLED MACHINERY

This application is a continuation of application Ser. No. 793,070 filed as PCT JP85/00073 on Feb. 20, 1985, published as W85/03667 on Aug. 29, 1985 now abandoned.

TECHNICAL FIELD

The present invention relates to a machine tool for tracer controlled machining and numerically controlled machining.

The present invention relates to a machine tool of the type which comprises a tracing control apparatus, an NC (numerical control) apparatus, a three-axis driving means for the tracer controlled machining, and a three-axis driving means for the numerically controlled machining, wherein the three-axis driving means for the tracer controlled machining and the three-axis driving means for the numerically controlled machining can be controlled independently.

BACKGROUND ART

Conventionally, in a machine tool of this kind, as shown in FIG. 1, control instruction data from the tracing control apparatus 1 and the NC apparatus 2 are switched and transmitted selectively to the three-axis driving means for the tracer controlled machining 4 and the three-axis driving means for the numerically controlled machining 5 through switching circuits 3X, 3Y, and 3Z, in accordance with two selection signals $S_A$ and $S_B$, wherein the selection signal $S_A$ and the selection signal $S_B$ are used as a tracer controlled machining selection signal and a numerically controlled machining selection signal, respectively.

When the tracer controlled machining selection signal $S_A$ is selected by the switching circuits, both the three-axis driving means for the tracer controlled machining 4 and the three-axis driving means for the numerically controlled machining 5 are occupied by the tracing control apparatus 1, as a result, both of these driving means are controlled by control instructions transmitted from the tracing control apparatus 1 through the switching circuits 3X, 3Y, and 3Z. Therefore, in this case, the movement of the tracer provided in the tracer-head at the tracer controlled machining side is transmitted to both the cutters which are provided at the tracer controlled machining side and at the numerically controlled machining side respectively. The predetermined tracer controlled machining is performed by one of those cutters or by both of those cutters simultaneously.

When the numerically controlled machining selection signal $S_B$ is selected by the switching circuits, both the three-axis driving means for the tracer controlled machining 4 and the three-axis driving means for the numerically controlled machining 5 are occupied by the numerical control apparatus 2. As a result both of these driving means are controlled by the control instructions from the numerical control apparatus 2 through the switching circuits 3X, 3Y, and 3Z. Therefore, in this case, the tracer provided in the tracer-head at the tracer controlled machining side is removed, and the control instruction from the numerical control apparatus is transmitted to both the cutters which are provided at the tracer controlled machining side and at the numerically controlled machining side respectively. The predetermined numerically controlled machining is performed by one of those cutters or by both of those cutters simultaneously.

In the switching circuit 3X shown in FIG. 1, 31 and 32 are AND gates receiving the control instruction from the tracing control apparatus 1 and the tracer controlled machining selection signal $S_A$, 33 and 34 are AND gates receiving the control instruction from the numerical control apparatus 2 and the numerically controlled machining selection signal $S_B$, 35 is an OR gate receiving the output signal from the AND gate 31 or 33 and supplying the predetermined instruction to the three-axis driving means for the tracer controlled machining 4, and 36 is an OR gate receiving the output signal from the AND gate 32 or 34 and supplying the predetermined instruction to the three-axis driving means for the numerically controlled machining 5. The switching circuits 3Y and 3Z are constituted similarly.

In the three-axis driving means for the tracer controlled machining 4, 41, 42, and 43 are motors which drive the X axis, Y axis, and Z axis, respectively, in accordance with the control instruction supplied to the driving means 4. Reference numerals 44, 45, and 46 are position detectors, each of which detects the movement of the tool or the table in each axial direction. Position data detected by the position detectors 44, 45, and 46 are fed back through a feedback circuit $F_1$ to the tracing control apparatus 1 and the numerical control apparatus 2. Thereby, each of the control apparatuses monitors the position data of the tool or the table driven by the driving motors.

In the three-axis driving means for the numerically controlled machining 5, 51, 52, and 53 are motors, which drive the X axis, Y axis, and Z axis, respectively, in accordance with the control instruction supplied to the driving means 5. Reference numerals 54, 55 and 56 are position detectors, each of which detects the movement of the tool or the table in each axial direction. Position data detected by the position detector 54, 55, and 56 are fed back through a feedback circuit $F_2$ to the tracing control apparatus 1 and the numerical control apparatus 2. Thereby, each of the control apparatuses monitors the position data of the tool or the table driven by the driving motors.

Three pairs of the switching circuits 3X, 3Y, and 3Z are used in order to switch the circuit. The X-axis driving motors 41 and 51, which are provided in the driving means 4 and 5, respectively, are controlled by the control instruction transmitted through the switching circuit 3X. Similarly, the Y-axis driving motors 42 and 52, which are provided in the driving means 4 and 5, respectively, are controlled by the control instruction transmitted through the switching circuit 3Y. Further, the Z-axis driving motors 43 and 53, which are provided in the driving means 4 and 5, respectively, are controlled by the control instruction transmitted through the switching circuit 3Z.

In this apparatus of the prior art, when the numerically controlled machining selection signal $S_B$ is selected, the three-axis driving means for the tracer controlled machining is also occupied by the numerical control apparatus. Therefore, there is a problem that the three-axis driving means for the tracer controlled machining is idling when it is not necessary to perform the numerically controlled machining with both the cutters which are provided at the tracer controlled machining side and at the numerically controlled machining side, simultaneously.

Also, when the tracer controlled machining selection signal $S_A$ is selected, the three-axis driving means for the numerically controlled machining is also occupied by the tracing control apparatus. Therefore, there is a problem that the three-axis driving means for the numerically controlled machining is idling when it is not necessary to perform the tracer controlled machining with both the cutters which are provided at the tracer controlled machining side and at the numerically controlled machining side, simultaneously.

DISCLOSURE OF THE INVENTION

In view of the above-mentioned problems, the object of the present invention is to enable the preparation for the tracer controlled machining or the conversion of the tracer controlled machining data into digital information by using the three-axis driving means for the tracer controlled machining simultaneously with the predetermined numerically controlled machining by using the three-axis driving means for the numerically controlled machining and to improve the efficiency of the machining process and the efficiency of the utilization of the machine tool, on the basis of the idea to use additionally a numerically controlled machining and tracer controlled machining selection signal besides the tracer controlled machining selection signal and the numerically controlled machining selection signal, and to control the three-axis driving means for the tracer controlled machining and the three-axis driving means for the numerically controlled machining with the tracing control apparatus and the numerical control apparatus independently, when the above numerically controlled machining and tracer controlled machining selection signal is selected by the switching circuits.

According to the present invention, there is provided a machine tool for tracer controlled machining and numerically controlled machining comprising a tracing control apparatus; a numerical control apparatus; a switching circuit for switching and transmitting selectively control constructions from the tracing control apparatus and the numerical control apparatus, to a three-axis driving means for the tracer controlled machining and a three-axis driving means for the numerically controlled machining in accordance with selection signals; and position data feedback circuits from each of the three-axis driving means for the tracer controlled machining and the three-axis driving means for the numerically controlled machining to each of the tracing control apparatus and the numerical control apparatus; characterized in that a numerically controlled machining and tracer controlled machining selection signal is used as one of the selection signals besides a tracer controlled machining selection signal and a numerically controlled machining selection signal, and when the above numerically controlled machining and tracer controlled machining selection signal is selected, the three-axis driving means for the tracer controlled machining is controlled by the tracing control apparatus, and the three-axis driving means for the numerically controlled machining is controlled by the numerical control apparatus, independently.

BRIEF DESCRIPTION OF THE DRAWINGS

FIGS. 3, 3A, and 3B are a circuit diagram showing in detail the constitution of the machine tool shown in FIG. 2;

FIGS. 8, 8A, and 8B are a diagram explaining the transmitting state of the instructions which are sent out and the data which are fed back in the apparatus shown in FIG. 3.

BEST MODE FOR CARRYING OUT THE INVENTION

Figure 1:
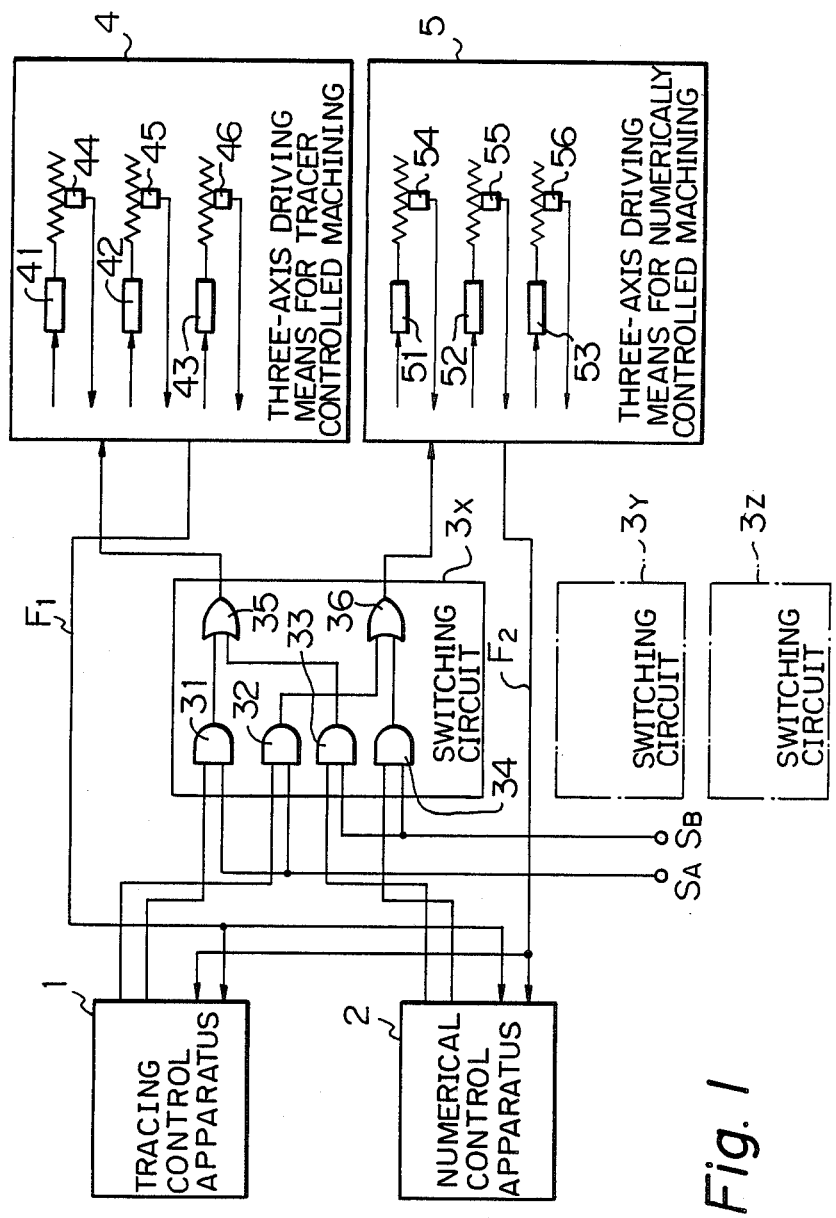
FIG. 1 is a circuit diagram showing an example of the machine tool for the tracer controlled machining and the numerically controlled machining in the prior art.
Figure 2:
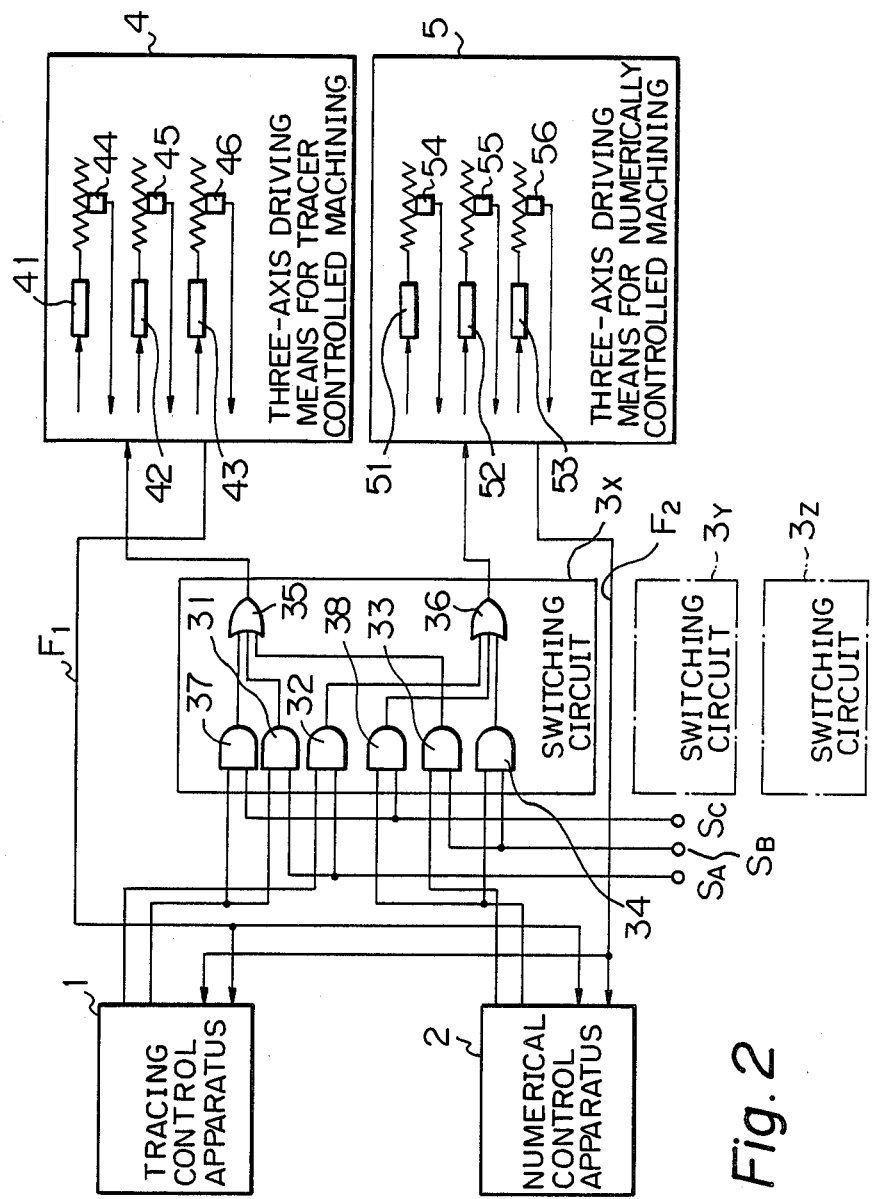
FIG. 2 is a circuit diagram showing an embodiment of the machine tool for the tracer controlled machining and the numerically controlled machining in the present invention.

FIG. 2 is a circuit diagram showing an embodiment of the machine tool according to the present invention. In FIG. 2, the parts corresponding to those in FIG. 1 are designated by the same reference numerals as in FIG. 1.

In the apparatus shown in FIG. 2, the control instructions from the tracing control apparatus 1 and the numerical control apparatus 2 are switched and transmitted selectively to the three-axis driving means for the tracer controlled machining 4 and the three-axis driving means for the numerically controlled machining 5 in accordance with three selection signals $S_A$, $S_B$, and $S_C$, each of which is input to each of the switching circuits 3X, 3Y, and 3Z. Among those three selection signals, the selection signal $S_A$ and the selection signal $S_B$ are the above-mentioned tracer controlled machining selection signal and the numerically controlled machining selection signal respectively, and the selection signal $S_C$ is the numerically controlled machining and the tracer controlled machining selection signal.

When the tracer controlled machining selection signal $S_A$ or the numerically controlled machining selection signal $S_B$ is selected by the switching circuits 3X, 3Y, and 3Z, the operation of the circuit shown in FIG. 2 is the same as the operation of the circuit shown in FIG. 1.

Namely, when the tracer controlled machining selection signal $S_A$ is selected, both the three-axis driving means for the tracer controlled machining 4 and the three-axis driving means for the numerically controlled machining 5 are occupied by the tracing control apparatus 1, and both of those driving means are controlled together by the control instructions transmitted from the tracing control apparatus 1 through each of the switching circuits 3X, 3Y, and 3Z.

Also, when the numerically controlled machining selection signal $S_B$ is selected, both the three-axis driving means for the tracer controlled machining 4 and the three-axis driving means for the numerically controlled machining 5 are occupied by the numerical control apparatus 2, and both of those driving means are controlled together by the control instructions transmitted from the numerical control apparatus 2 through each of the switching circuits 3X, 3Y, and 3Z.

In the switching circuit 3X shown in FIG. 2, 37 is an AND gate receiving the control instruction from the tracing control apparatus 1 and the numerically controlled machining and tracer controlled machining selection signal $S_C$, 38 is an AND gate receiving the control instruction from the numerical control apparatus 2 and the numerically controlled machining and tracer controlled machining selection signal $S_C$, 35 is an OR gate supplying the predetermined instruction to the three-axis driving means for the tracer controlled machining 4 in case of receiving the output signal from either of the AND gate 31, 33, or 37, and 36 is an OR gate supplying the predetermined instruction to the three-axis driving means for the numerically controlled machining 5 in case of receiving the output signal from either of the AND gate 32, 34, or 38. Each of the switching circuits 3Y and 3Z is also constituted similarly.

Therefore, when the numerically controlled machining and tracer controlled machining selection signal $S_C$ is selected, the three-axis driving means for the tracer controlled machining 4 is controlled by the control instructions transmitted from the tracing control apparatus 1 through the AND gate 37 and the OR gate 35 in the switching circuit 3X, for example, and thereby, each movement of the driving motors 41, 42, and 43 driving each of three axes X, Y and Z is controlled respectively. Then, the position of the tool or the table in each axial direction is detected by the position detectors 44, 45, and 46. The position data detected by each of the position detectors 44, 45, and 46 are fed back through the feedback circuit $F_1$ to the tracing control apparatus 1 and the numerical control apparatus 2 respectively. Each control apparatus monitors the position data of the tool or the table driven by the driving motors.

Also, the three-axis driving means for the numerically controlled machining 5 is controlled by the control instructions transmitted from the numerical control apparatus 2 through the AND gate 38 and the OR gate 36 in the switching circuit 3X, for example. Thereby, each movement of the driving motors 51, 52 and 53 driving each of three axes X, Y, and Z is controlled respectively. Then, the position of the tool or the table in each axial direction is detected by the position detectors 54, 55, and 56. The position data detected by each of the position detectors 54, 55, and 56 are fed back through the feedback circuit $F_2$ to the tracing control apparatus 1 and the numerical control apparatus 2 respectively. Each control apparatus monitors the position data of the tool or the table driven by the driving motors.

In the circuit shown in FIG. 2, three pairs of switching circuits 3X, 3Y, and 3Z are also provided as in the circuit shown in FIG. 1. Each movement of the X-axis driving motor 41 in the driving means 4 and the X-axis driving motor 51 in the driving means 5 is controlled by the control instruction from the switching circuit 3X. Each movement of the Y-axis driving motor 42 in the driving means 4 and the Y-axis driving motor 52 in the driving means 5 is controlled by the control instruction from the switching circuit 3Y. Further, each movement of the Z-axis driving motor 43 in the driving means 4 and the Z-axis driving motor 53 in the driving means 5 is controlled by the control instruction from the switching circuit 3Z.

Thus, the three-axis driving means for the tracer controlled machining 4 is controlled by the tracing control apparatus 1, and the three-axis driving means for the numerically controlled machining 5 is controlled by the numerical control apparatus 2. Further, each of the control apparatuses 1 and 2 monitors the position data from each of the driving means 4 and 5. As a result, in the apparatus shown in FIG. 2, it is possible to prepare for the tracer controlled machining or the conversion of the tracer controlled machining data into digital information by using the three-axis driving means for the tracer controlled machining, simultaneously with the predetermined numerically controlled machining by using the three-axis driving means for the numerically controlled machining.

In the above description, the meaning of the preparation for the tracer controlled machining is the setting of the work or the regulation of the position of the attached tool, and the meaning of the conversion of the tracer controlled machining data into digital information is the successive detection of the locus of the tracing movement, the obtainment of the digital information by the calculation treatment of the detected locus, and subsequently recording the obtained digital information on an NC tape. In the above embodiment, the conversion process of the tracer controlled machining data into digital information is performed in the numerical control apparatus 2 by controlling the three-axis driving means for the tracer controlled machining 4 with the tracing control apparatus 1 and, further, by feeding back the position data of the tracing movement through the feedback circuit $F_1$ to the numerical control apparatus 2.

As each of the control apparatuses 1 and 2 always monitors the position data which are fed back from each of the driving means 4 and 5, it is possible to continue the predetermined work successively by switching the selection signals supplied to the switching circuits.

Figure 3B:
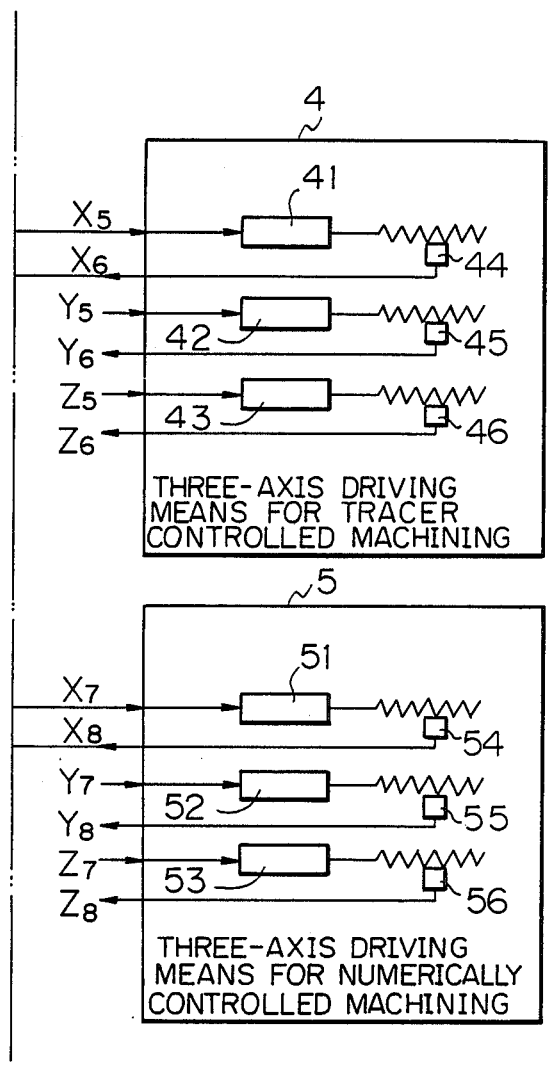

FIG. 3 shows the detailed constitution of the machine tool shown in FIG. 2. The control instruction $X_1$ transmitted from the tracing control apparatus 1 to the X-axis driving motor 41 in the three-axis driving means 4 is input to the AND gates 31 and 37 in the switching circuit 3X. Also, the control instruction $X_2$ transmitted from the tracing control apparatus 1 to the X-axis driving motor 51 in the three-axis driving means 5 is input to the AND gate 32 in the switching circuit 3X.

The control instruction $X_3$ transmitted from the numerical control apparatus 2 to the X-axis driving motor 51 in the three-axis driving means 5 is input to the AND gates 34 and 38 in the switching circuit 3X. Also, the control instruction $X_4$ transmitted from the numerical control apparatus 2 to the X-axis driving motor 41 in the three-axis driving means 4 is input to the AND gate 33 in the switching circuit 3X.

The control instruction $X_5$ which is output from the OR gate 35 in the switching circuit 3X is input to the X-axis driving motor 41 in the three-axis driving means for the tracer controlled machining 4, and the position data in the X-axis direction $X_6$ detected in the position detector 44 is fed back to the tracing control apparatus 1 and to the numerical control apparatus 2.

The control instruction $X_7$ which is output from the OR gate 36 in the switching circuit 3X is input to the X-axis driving motor 51 in the three-axis driving means for the numerically controlled machining 5, and the position data in the X-axis direction $X_8$ detected in the position detector 54 is fed back to the tracing control apparatus 1 and to the numerical control apparatus 2.

The constitution of each of the switching circuits 3Y and 3Z is the same as that of the switching circuit 3X. In this embodiment, there are provided six AND gates and two OR gates. These gates are interconnected as in the switching circuit 3X.

The control instructions $Y_1$ and $Y_2$ from the tracing control apparatus 1, the control instructions $Y_3$ and $Y_4$ from the numerical control apparatus 2, and the selection signals $S_A$, $S_B$, and $S_C$ are input to the switching circuit 3Y.

The control instructions $Z_1$ and $Z_2$ from the tracing control apparatus 1, the control instructions $Z_3$ and $Z_4$ from the numerical control apparatus 2, and the selection signals $S_A$, $S_B$, and $S_C$ are input to the switching circuit 3Z.

The control instructions $Y_5$ and $Y_7$, which are output from each of the OR gates in the switching circuit 3Y, are input to the Y-axis driving motor 42 in the driving means 4 and to the Y-axis driving motor 52 in the driving means 5, respectively. The position data in the Y-axis direction $Y_6$ and $Y_8$, which are detected by the position detectors 45 and 55 respectively, are fed back to the tracing control apparatus 1 and to the numerical control apparatus 2.

The control instructions $Z_5$ and $Z_7$ which are output from each of the OR gates in the switching circuit 3Z are input to the Z-axis driving motor 43 in the driving means 4 and to the Z-axis driving motor 53 in the driving means 5, respectively. The position data in the Z-axis direction $Z_6$ and $Z_8$, which are detected by the position detectors 46 and 56 respectively, are fed back to the tracing control apparatus 1 and to the numerical control apparatus 2.

The above-mentioned control instructions from the tracing control apparatus 1 and the numerical control apparatus 2 are switched and transmitted selectively to the driving motors which drive the three axes X, Y, and Z in the driving means 4 and 5, respectively, in accordance with the three selection signals $S_A$, $S_B$, and $S_C$, which are input to each of the switching circuits 3X, 3Y, and 3Z.

Figure 4:
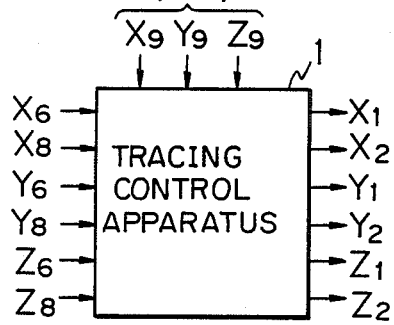
FIG. 4 is a diagram showing an example of the tracing control apparatus.
Figure 5:
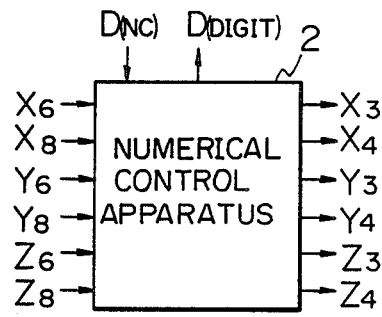
FIG. 5 is a diagram showing an example of the numerical control apparatus.
Figure 6:
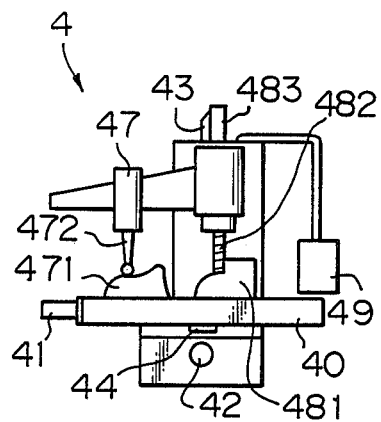
FIG. 6 is a diagram showing an example of the three-axis driving means for the tracer controlled machining.
Figure 7:
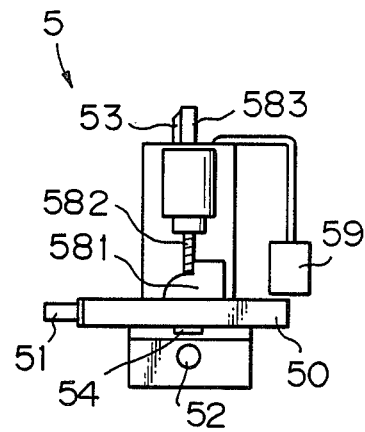
FIG. 7 is a diagram showing an example of the three-axis driving means for the numerically controlled machining.

FIG. 4 is a diagram showing an example of the tracing control apparatus 1, FIG. 5 is a diagram showing an example of the numerical control apparatus 2, FIG. 6 is a diagram showing an example of the three-axis driving means 4 for the tracer controlled machining, and FIG. 7 is a diagram showing an example of the three-axis driving means 5 for the numerical control machining.

As above-mentioned, the tracing control apparatus 1 shown in FIG. 4 outputs the control instructions $X_1$, $X_2$, $Y_1$, $Y_2$, $Z_1$, and $Z_2$ to the driving means 4 and 5, and the position data $X_6$, $X_8$, $Y_6$, $Y_8$, $Z_6$, and $Z_8$ are fed back from the driving means 4 and 5. The output data $X_9$, $Y_9$, and $Z_9$ which are produced by each of the differential transformers 47X, 47Y, and 47Z provided in the tracer head 47 in the three-axis driving means for the tracer controlled machining 4 shown in FIG. 6 are supplied to the tracing control apparatus 1. Each of the output data $X_9$, $Y_9$, and $Z_9$ corresponds to each of the vector components in the X-, Y-, and Z-axis direction, those of which are detected by the differential transformers 47X, 47Y, and 47Z respectively when the tracer 472 provided in the tracer-head 47 in the driving means 4 moves along the surface of the model 471.

Also, the numerical control apparatus 2 shown in FIG. 5 outputs the control instructions $X_3$, $X_4$, $Y_3$, $Y_4$, $Z_3$, and $Z_4$ to the driving means 4 and 5, and the position data $X_6$, $X_8$, $Y_6$, $Y_8$, $Z_6$, and $Z_8$ are fed back from the driving means 4 and 5. The NC instruction data D(NC) recorded on the NC tape and the like is input to the numerical control apparatus 2. Also, when the numerically controlled machining and tracer controlled machining selection signal $S_C$ is selected, the digital information data D(DIGIT) is obtained from the numerical control apparatus 2, in accordance with the position data which are fed back to the numerical control apparatus 2 from the three-axis driving means for the tracer controlled machining 4.

The three-axis driving means for the tracer controlled machining 4 shown in FIG. 6 comprises the table 40 on which the model 471 and the work 481 are mounted and fixed. The table 40 is driven in each axial direction by the X-axis driving motor 41, Y-axis driving motor 42, and Z-axis driving motor 43. The tracer 472 is provided in the tracer-head 47. The driving motors 41, 42, and 43 which drive each axis are controlled so that the tracer 472 moves along the surface of the model 471. The work 481 which is linked mechanically with the model 471 is machined to the same shape as that of the model 471 by the cutter 482 which is linked mechanically with the tracer-head 47. Reference numeral 483 is a spindle motor which drives the rotation of the cutter 482, 49 is the operation panel provided in order to switch on the power supply, etc. In FIG. 6, only the position detector 44 is shown, the other position detectors 45 and 46 are not shown.

The three-axis driving means for the numerically controlled machining 5 shown in FIG. 7 comprises the table 50 on which the work 581 is mounted and fixed. The table 50 is driven in each axial direction by the X-axis driving motor 51, Y-axis driving motor 52, and Z-axis driving motor 53. The work 581 is machined in accordance with the NC instruction data D(NC) by the cutter 582. Reference numeral 583 is the spindle motor which drives the rotation of the cutter 582, 59 is the operation panel provided in order to switch on the power supply, etc. In FIG. 7, only the position detector 54 is shown. The other position detectors 55 and 56 are not shown.

Figure 8B:
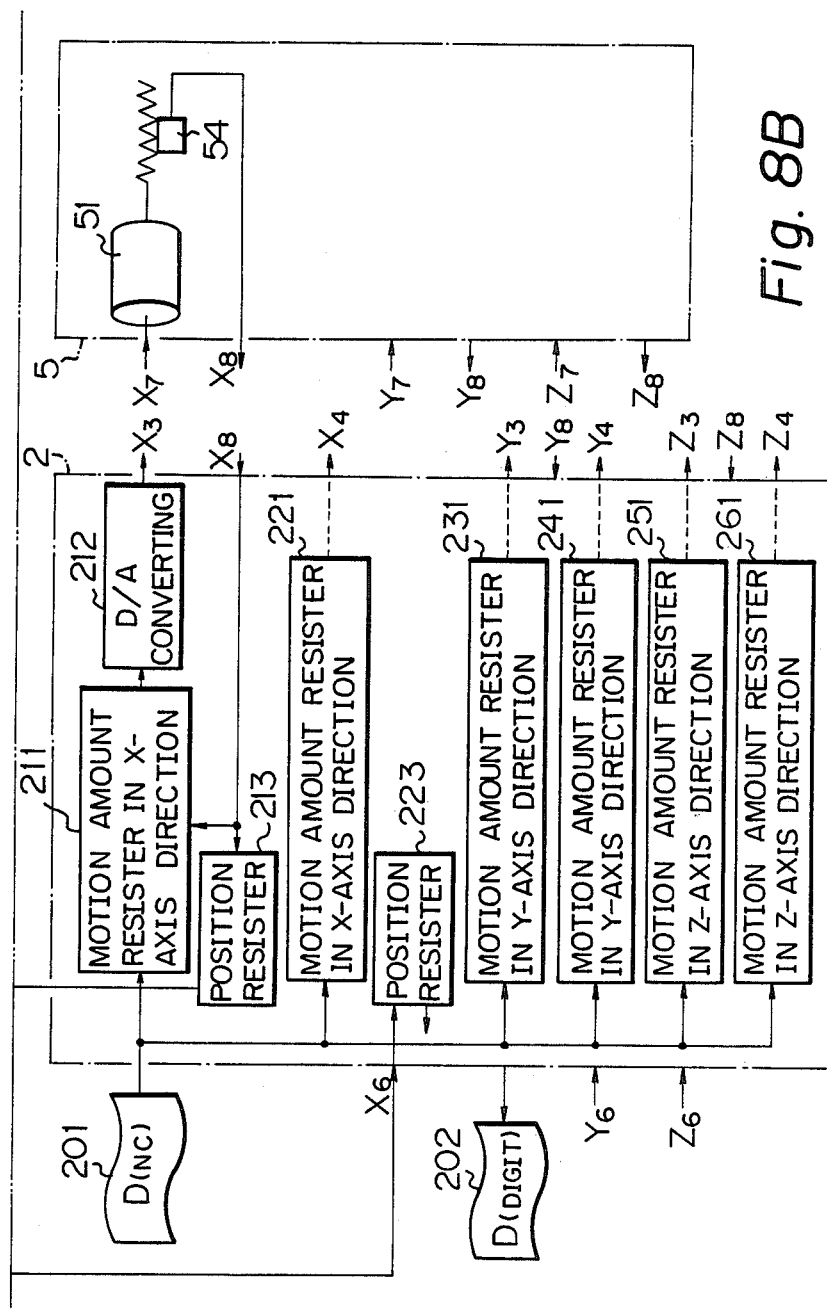

FIG. 8 shows the transmitting state of the control instructions transmitted to the driving motors in the driving means 4 and 5 from the above control apparatuses 1 and 2 and the transmitting state of the position data which are fed back to each of the control apparatuses 1 and 2 from each of the position detectors in the driving means 4 and 5.

As shown in FIG. 8, each of the output data $X_9$, $Y_9$, and $Z_9$ detected by each of the differential transformers 47X, 47Y, and 47Z in the tracer-head 47 in accordance with the movement of the tracer 472 in the three-axis driving means for the tracer controlled machining 4 is input to the tracing control apparatus 1. The output data $X_9$, $Y_9$, and $Z_9$ correspond to the vector components in the X-, Y-, and Z-axis direction, which are detected by the differential transformers 47X, 47Y, and 47Z respectively when the tracer 472 moves along the surface of the model. The output data $X_9$, $Y_9$, and $Z_9$ are successively set in the vector registers in the X-axis direction 111 and 121, the vector registers in the Y-axis direction 131 and 141, and the vector registers in the Z-axis direction 151 and 161 in the tracing control apparatus 1, respectively.

The output data $X_9$, which is successively set in the vector register in the X-axis direction 111, is converted from a digital instruction into an analogue control instruction $X_1$ by the DA converter 112. Similarly, the output data $X_9$, which is successively set in the other vector register in the X-axis direction 121, is converted from a digital instruction into an analogue control instruction $X_2$. Further, the output data $Y_9$ and $Z_9$ which are successively set in the vector registers in the Y-axis direction 131 and 141, and the vector registers in the Z-axis direction 151 and 161, respectively, are converted from a digital instruction into analogue control instructions $Y_1$, $Y_2$, $Z_1$, and $Z_2$.

The position data $X_6$ detected by the position detector in the X-axis direction 44 in the three-axis driving means for the tracer controlled machining 4 is successively set in the position register 113 in the tracing control apparatus 1 and the position register 223 in the numerical control apparatus 2.

Each of the position data $Y_6$ detected by the detector in the Y-axis direction and the position data $Z_6$ detected by the detector in the Z axis direction is set in the corresponding position register in each of the control apparatuses 1 and 2.

Thus, in the numerical control apparatus 2, the digital information data D(DIGIT) is operated in accordance with the position data comprising the position data in each axial direction which are fed back to the numerical control apparatus 2 from each of position detectors in the three-axis driving means for the tracer controlled machining 4 and successively set in the predetermined position registers corresponding to each axial direction respectively (in FIG. 8, only the position register in the X-axis direction 223 is shown). Then, the operated data D(DIGIT) which is recorded on NC tape 202 and the like is obtained from the numerical control apparatus 2.

Also, the NC instruction data D(NC) which is recorded on NC tape 201 and the like is input to the numerical driving apparatus 2. The motion amount in each axial direction is successively set in each of the corresponding motion amount registers in the X-axis direction 211 and 221, in the Y-axis direction 231 and 241, and in the Z-axis direction 251 and 261, in accordance with the data D(NC).

The motion amount in the X-axis direction which is successively set in the motion amount register in the X-axis direction 211 is converted from a digital instruction into an analogue control instruction $X_3$ by the DA converter 212. Similarly, the motion amount in the X-axis direction which is successively set in the other motion amount register in the X-axis direction 221 is converted from a digital instruction into an analogue control instruction $X_4$. Further, each of the motion amount in the Y-axis direction, which is successively set in the motion amount registers in the Y-axis direction 231 and 241, and the motion amount in the Z-axis direction, which is successively set in the motion amount registers in the Z-axis direction 251 and 261, is converted from a digital instruction into analog control instruction $Y_3$, $Y_4$, $Z_3$, and $Z_4$.

The position data $X_8$ detected by the position detector in the X-axis direction 54 in the three-axis driving means for the numerically controlled machining 5 is successively set in the position register 213 in the numerical control apparatus 2 and the position register 123 in the tracing control apparatus 1.

The position data $X_8$ is also fed back to the motion amount register in the X-axis direction 211, and thereby, the motion amount register is controlled to compensate for the difference from the NC instruction data D(NC).

Each of the position data $Y_8$ which is detected by the position detector in the Y-axis direction and the position data $Z_8$ which is detected by the position detector in the Z-axis direction is fed back to each of the control apparatuses 1 and 2.

As mentioned above, in the apparatus shown in FIG. 2, the numerically controlled machining and tracer controlled machining selection signal is used as one of the selection signals which are input to the switching circuits besides the tracer controlled machining selection signal and the numerically controlled machining selection signal. Therefore, it is possible to prepare for the tracer controlled machining or the conversion of the tracer controlled machining data into digital information simultaneously with the predetermined numerically controlled machining. Therefore, it is possible to improve the efficiency of the machining process and the efficiency of the utilization of the machining tool.

We claim:

1. A machine tool control system for tracer controlled machining and numerically controlled machining comprising:

a tracing control means for delivering a control instruction based on an externally generated input for tracer controlled machining;

a numerical control means for delivering a control instruction based on an externally generated input for numerically controlled machining;

three-axis driving means for tracer controlled machining for driving X, Y, and Z axis motions of tracer controlled operation and for detecting positions in X, Y, and Z axis directions;

three-axis driving means for numerically controlled machining for driving X, Y, and Z axis motions of numerically controlled operation and for detecting positions in X, Y, and Z axis directions, signals of the detection of positions in X, Y, and Z directions from said three-axis driving means for tracer controlled machining and said three-axis driving means for numerically controlled machining being fed back to said tracing control means and said numerical control means;

a plurality of switching circuits each of which has a logic gate circuit means for receiving instructions from said tracing control means and said numerical control means, and three kinds of operation selection signals through an array of input side gate circuits having groups of three logic gate circuits and delivering two kinds of output signals through an array of output side gate circuits to be supplied to said three-axis driving means for tracer controlled machining and said three-axis driving means for numerically controlled machining, wherein the outputs of said tracing control means and said numerical control means are connected to first input terminals of said array of input side gate circuits; and operation selection inputting means having first, second, and third terminals receiving externally generated operation selection signals corresponding to a tracer controlled operation, a numerically controlled operation, and a tracer and numerically controlled operation, wherein said first, second and third terminals are connected to second input terminals of said array of input side gate circuits;

instructions from said tracing control means and said numerical control means being supplied to said first input terminals of said array of input side gate circuits in said switching circuits;

signals from said terminals of said operation selection inputting means being supplied to said second input terminals of said array of input side gate circuits in said switching circuits, such that (a) when the first terminal in said operation selection inputting means is selected, both of said three-axis driving means for tracer controlled machining and for numerically controlled machining are controlled by the control instruction from said tracing control means, (b) when the second terminal in said operation selection inputting means is selected, both of said three-axis driving means for tracer controlled machining and for numerically controlled machining are controlled by the control instruction from said numerical control means, and (c) when the third terminal in said operation selection inputting means is selected, the three-axis driving means for tracer controlled machining is controlled by the control instruction from said tracing control means and the three-axis driving means for numerically controlled machining is controlled by the control instruction from said numerical control means, concurrently, respectively and independently, said positions being continuously monitored even when switching between one of said first, second, and third terminals.

2. A machine tool control system according to claim 1, wherein said switching circuit has a first AND gate as one of said logic gate circuits receiving the control instruction from said tracing control means and a signal supplied from said third terminal, and a second AND gate as another of said logic gate circuits receiving the control instruction from said numerical control means and a signal supplied from said third terminal and wherein the output from said first AND gate is operatively coupled to said three-axis driving means for tracer controlled machining, and the output of said second AND gate is operatively connected to said three-axis driving means for numerically controlled machining.

3. A machine tool control system according to claim 1, wherein said switching circuit has a first AND gate as one of said logic gate circuits receiving said control instruction from said tracing control means and a signal supplied from said first terminal, a second AND gate as another of said logic gate circuits receiving said control instruction from said tracing control means and a signal supplied from said third terminal, a third AND gate as another of said logic gate circuits receiving said control instruction from said numerical control apparatus and a signal supplied from said second terminal and an OR gate receiving the outputs from each of the above-mentioned AND gates, the output of said OR gate being supplied to said three-axis driving means for the tracer controlled machining.

4. A machine tool control system according to claim 1, wherein said switching circuit has a first AND gate as one of said logic gate circuits receiving said control instruction from said numerical control means and a signal supplied from said second terminal, a second AND gate as another of said logic gate circuits receiving said control instruction from said numerical control means and a signal supplied from said third terminal, a third AND gate as another of said logic gate circuits receiving said control instruction from said tracing control means and a signal supplied from said first terminal, and an OR gate receiving the outputs from each of the above-mentioned AND gates, the output of said OR gate being supplied to said three-axis driving means for the numerically controlled machining.

5. A machine tool control system according to claim 1, wherein said tracing control means comprises vector registers in each of which a vector component signal in each of X, Y, and Z axis directions of tracer controlled operation of said three-axis driving means for tracer controlled machining is set, D/A converter means for converting said vector component signal set in each of said vector registers from a digital instruction to an analog control instruction for each of said three axis driving means for tracer controlled machining and for numerically controlled machining, first position registers to each of which the position detection signal in each of X, Y, and Z axis directions from said three-axis driving means for tracer controlled machining is fed back, and second position registers to each of which the position detection signal in each of X, Y, and Z axis directions from said three-axis driving means for numerically controlled machining is fed back.

6. A machine tool control system according to claim 1, wherein said numerical control means comprises motion amount registers in each of which a motion amount signal in each of X, Y, and Z axis directions for said three-axis driving means of numerically controlled machining is set, D/A converter means for converting said motion amount signal set in each of said motion amount registers from a digital instruction to an analog control instruction for each of said three-axis driving means for tracer controlled machining and for numerically controlled machining, first position registers to each of which the position detection signal in each of X, Y, and Z axis directions from said three-axis driving means for tracer controlled machining is fed back, and second position registers to each of which the position detection signal in each of X, Y, and Z axis directions from said three-axis driving means for numerically controlled machining is fed.

* * * * *